US 6,862,266 B1

(12) United States Patent
Kim

(10) Patent No.: US 6,862,266 B1
(45) Date of Patent: Mar. 1, 2005

(54) LOOP TEST APPARATUS OF PACKET ROUTING BUS IN COMMUNICATION SYSTEM AND LOOP TEST METHOD

(75) Inventor: Boo Soo Kim, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 752 days.

(21) Appl. No.: 09/639,084

(22) Filed: Aug. 16, 2000

(30) Foreign Application Priority Data

Aug. 17, 1999 (KR) ........................................ 1999-33975

(51) Int. Cl.[7] ................................................ G06F 11/22
(52) U.S. Cl. ..................... 370/249; 370/362; 714/25; 710/110
(58) Field of Search ............................... 370/249, 248, 370/250, 362, 364, 365; 714/25, 27, 30–31; 710/300, 109, 110

(56) References Cited

U.S. PATENT DOCUMENTS

| 5,991,840 A | * 11/1999 | Suzuki | ......................... 710/300 |
| 6,052,362 A | * 4/2000 | Somer | ......................... 370/246 |
| 6,363,067 B1 | * 3/2002 | Chung | ......................... 370/364 |

* cited by examiner

Primary Examiner—Seema S. Rao
Assistant Examiner—Robert C. Scheibel
(74) Attorney, Agent, or Firm—Morgan Lewis & Bockius LLP

(57) ABSTRACT

A loop test apparatus of a packet routing bus in a communication system and a loop test method thereof capable of testing entire functions of the packet routing bus of a full-duplex transmission mode and transmitting and receiving nodes by adding a loop test function to the packet routing bus. The loop test apparatus of a packet routing bus includes: a transmitting node and a receiving node, each including a transmitting driver and a receiving driver and each having a loop path for a data packet from the corresponding transmitting driver to the receiving driver; a transmitting bus master including a register for storing an address of one of the transmitting node and receiving node for managing a transfer of the data packet on a transmitting packet routing bus; a receiving bus master including a register for storing an address of one of the transmitting in node and receiving node for managing a transfer of the data packet on a receiving packet routing bus; and a testing element for writing a test data packet to one of the transmitting node and the receiving node and writing the address of one of the transmitting node and the receiving node to transmit or receive the test data packet to or from the register of the corresponding bus master.

15 Claims, 8 Drawing Sheets value0 : external input to node
value1 : output loop signal

LOOP TEST APPARATUS OF PACKET ROUTING BUS IN COMMUNICATION SYSTEM AND LOOP TEST METHOD

This application claims the benefit of Korean Application No. 33975/1999 filed Aug. 17, 1999, which is hereby incorporated by reference.

BACKGROUND OF THE INVENTION

Field of the Invention

The present invention relates to a packet routing bus in a communication system, and more particularly, to a loop test apparatus of a packet routing bus in a communication system and a loop test method thereof 2. Discussion of the Related Art In a communication system, methods of data communication include a simplex communication mode and a duplex communication mode. These modes operate in accordance with the data flow transmission between two systems. The duplex transmission mode includes a half-duplex transmission mode and a full-duplex transmission mode.

Since the full-duplex transmission mode allows duplex transmission between two systems at the same time, free data flow can be achieved. In that regard, the full-duplex transmission mode is useful for transmitting and receiving a large amount of data.

A data packet (also referred to as "packet data" or "packet") relates to a data bundle used in a data transmission. Packet data is commonly transmitted though a telephone or network. In a packet data transmission, data is not successively transmitted beginning to end. Rather, data to be transmitted is divided into appropriate sizes to form a data packet, and these packets are transmitted one by one. Each data packet includes a certain size of data, a destination address and control information, such as a control sign. For example, a data packet can be transmitted through a packet exchanger using header data and can exist in various sizes, such as 53 bytes or 1024 bytes, depending on the packet exchanger.

Routing relates to a process for determining the appropriate path for transmitting data in a communication network. A router commonly determines where to send data and transmits data to the destination system.

A base station system according to a related art will be explained with reference to the attached drawings. FIG. 1 is a block diagram showing transmitting and receiving nodes in a network board which enables inter processor communication (IPC).

As shown in FIG. 1, the transmitting and receiving nodes in a network board 100 includes first to fourth receiving nodes 11, 12, 13 and 14 (Rx nodes), first to fourth transmitting nodes 16, 17, 18 and 19 (Tx nodes), transmitting and receiving packet routing buses 20 and 21 of a full-duplex transmission mode, a transmitting bus master 22, a receiving bus master 23, and a U-turn node 15. The receiving nodes 11–14 are connected to a trunk node of a base station controller. The transmitting nodes 16–19 are connected to a processor board in the base station system (for example, an alarm collection and maintenance board assembly) and a system clock board (for example, a timing management circuit board assembly). During operation, the transmitting bus master 22 searches the receiving nodes 11–14 and generates a control signal (a "read" signal) if there is a data packet in the receiving nodes 11–14. If the control signal is triggered, the data packet is read into the transmitting packet routing bus 20 and written to a destination transmitting node of the transmitting nodes 16–19. The receiving bus master 23 searches the transmitting nodes 16–19 and generates a control signal if there is a data packet in the transmitting nodes 16–19. If the control signal is triggered, the data packet is read onto the receiving packet routing bus 21 and written to a destination receiving node of the receiving nodes 11–14. The U-turn node 15 U-turns the data packet generated by the transmitting nodes 16–19 if the destination address of the data packet generated by the transmitting nodes 16–19 uses the transmitting nodes 16–19 as the destination.

The transmitting nodes 16–19 are matched with the receiving packet routing bus 21, so that the data packet of the transmitting nodes 16–19 are read onto the receiving packet routing bus 21 and are written to the receiving nodes 11–14 and the U-turn node 15.

The receiving nodes 11–14 and the U-turn node 15 are matched with the transmitting packet routing bus 20, so that the data packet from the receiving nodes 11–14 and the U-turn node 15 are read onto the transmitting packet routing bus 22. The transmitting nodes 16–19 are also matched with the transmitting packet routing bus 20, so that the data packet of the no transmitting packet routing bus 20 is written to the transmitting nodes 16–19.

FIG. 2 is a flow chart showing a packet routing method for transmitting and receiving nodes in the related art. The packet routing method used by the transmitting and receiving nodes 11–14, 16–19 in the network board 100 of FIG. 1 will be described.

As shown in FIG. 1, the receiving bus master 23 searches for the presence of the transmitting data packet in the transmitting nodes 16–19 matched with the receiving packet routing bus 21 (step S1).

If the transmitting data packet is found in the transmitting nodes 1619, the receiving bus master 23 generates a control signal which causes the data packet of the transmitting nodes 16–19 to be read onto the receiving packet routing bus 21 (step S2).

Then, the receiving bus master 23 determines the destination node of the data packet by searching for the destination address data from the data packet and writes the data packet in the destination node of the receiving packet routing bus 21 (step S3). At this time, one of the receiving nodes 11–14 is the destination node and the data packet is written to one of the receiving nodes 11–14.

The data packet is then routed from the receiving nodes 11–14 to a trunk node of the base station controller (BSC). However, if one of the transmitting nodes 16–19 is the destination node, the data packet is written to the U-turn node 15.

The transmitting bus master 22 determines whether or not there is a data packet in the receiving nodes 11–14 and the U-turn node 15 matched with the transmitting packet routing bus 20 (step S4).

As a result, if there is data packet in the receiving nodes 11–14, the transmitting bus master 22 generates a control signal which causes the data packet of the receiving nodes 11–14 to 15 be read onto the transmitting packet routing bus 20. The transmitting bus master 22 then searches for destination address data from the data packet read on the transmitting packet routing bus 20.

If there is address data in the data packet, the destination node of the data packet is determined and the data packet is written to the destination node (one of the transmitting nodes 16–19). The data packet is then routed from one of the transmitting nodes 16–19 to another processor board in the base station system.

Also, if there is a data packet in the U-turn node 15, the transmitting bus master 22 transfers the data packet from the U-turn node 15 to the transmitting data packet bus 20 with the use of a control signal. The transmitting bus master 22 searches for destination address data from the read data packet to determine a destination transmitting node. If the data packet is written to the destination transmitting node, the data packet is routed from the destination transmitting node to another processor board of the base station (step S5).

The U-turn node 15 is used in case where the transmitting nodes 16–19 route the data packet to the other processor board of the base station system connected to the transmitting nodes 16–19. The presence of a data packet in the transmitting nodes 16–19 is searched for by the receiving bus master 23. If there is a data packet in the transmitting nodes 16–19, the data packet is read into the receiving packet routing bus 21.

Subsequently, if the destination address of the data packet read in the receiving packet routing bus 21 is the other processor board of the base station, the receiving bus master 23 writes the data packet to one of the transmitting nodes 16–19. At this time, since the data packet cannot be directly written from the receiving packet routing bus 21 to the transmitting packet routing bus 20, the data packet is written to the U-turn node 15. Then, the transmitting bus master 22 reads the data packet from the U-turn node 15 and determines the destination address from the data packet. The data packet is then written to the transmitting node (one of the transmitting nodes 16–19) with the appropriate destination address.

FIG. 3 is a detailed view showing the transmitting and receiving nodes of FIG. 1. In FIG. 3, the first receiving node 11 is representative of the receiving nodes 11–14 in FIG. 1 and the first transmitting node 16 is representative of the transmitting nodes 16–19 in FIG. 1.

The first receiving node II includes a transmitting driver 11a and a receiving driver 11b. The transmitting driver 11aroutes the data packet written in the receiving packet routing bus 21 to the trunk node of the base station controller. The receiving driver 11b reads the data packet routed from the trunk node of the base station controller to the transmitting packet routing bus 20.

The first transmitting node 16 includes a transmitting driver 16a and a receiving driver 16b. The transmitting driver 16a routes the data packet written in the transmitting packet routing bus 20 to the other processor of the base station system. The receiving driver 16b reads the data packet routed from the other processor of the base station system to the receiving packet routing bus 21.

In a network which enables communication between the processors of the base station in the related art communication system, in order to identify whether the data packet is normally routed in both the transmitting node matched with the receiving packet routing bus and the receiving node matched with transmitting packet routing bus, it is necessary to identify whether (1) the processor board of the base station connected with the transmitting node has received the data packet routed in the receiving node and (2) the trunk board of the base station controller connected with the receiving node has received the data packet routed in the transmitting node. Accordingly, to identify transmission and reception of the data packet, a communication system such as the base station and the base station controller should be established. Finally, the related art communication system has a further problem in that functions of the respective transmitting and receiving nodes cannot be identified independently before the base station and the base station controller are established.

SUMMARY OF THE INVENTION

Accordingly, the present invention is directed to a loop test apparatus of a packet routing bus and a loop test method thereof that substantially obviate one or more of the problems due to limitations and disadvantages of the related art.

An object of the present invention is to provide a loop test apparatus and a loop test method which can test entire functions of the packet routing bus of a full-duplex transmission mode and transmitting and receiving nodes.

Additional features and advantages of the invention will be set forth in the description in which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the loop test apparatus of a packet routing bus includes: a transmitting node and a receiving node, each including a transmitting driver and a receiving driver and each having a loop path for a data packet from the corresponding transmitting driver to the receiving driver; a transmitting bus master including a register for storing an address of one of the transmitting node and receiving node for managing a transfer of the data packet on a transmitting packet routing bus; a receiving bus master including a register for storing an address of one of the transmitting node and receiving node for managing a transfer of the data packet on a receiving packet routing bus; and a testing element for writing a test data packet to one of the transmitting node and the receiving node and writing the address of one of the transmitting node and the receiving node to transmit or receive the test data packet to or from the register of the corresponding bus master.

In another aspect, in a network board having a plurality of transmitting and receiving nodes each having a transmitting driver and a receiving driver, transmitting and receiving packet routing buses for transmitting and receiving data to and from the transmitting and receiving nodes, and transmitting and receiving bus masters for controlling the transmitting and receiving packet routing buses, a loop test method of a packet routing bus includes the steps of: writing a test data packet for routing in a receiving node to a test node for testing by a testing element; writing the test data packet of the test node to the transmitting driver of the receiving node by the receiving bus master; looping the test data packet from the transmitting driver of the receiving node to the receiving driver of the receiving node; and routing the test data packet to the receiving driver of the test node of the transmitting node by the transmitting bus master.

In other aspect, in a network board having a plurality of transmitting and receiving nodes each having a transmitting driver and a receiving driver, transmitting and receiving packet routing buses for transmitting and receiving a data packet to and from the transmitting and receiving nodes, a U-turn ode for U-turning the data packet of the receiving packet using bus to the transmitting packet routing bus, a transmitting bus master for controlling the transmitting packet routing bus, and a receiving bus master for controlling the receiving packet routing bus, a loop test method of a packet routing bus includes the steps of: writing a test data packet for routing in a transmitting node to a test node for testing by a testing element; writing the test data packet to the U-turn node by the receiving bus master; writing the test data packet of the U-turn node to the transmitting node for testing by the transmitting bus master; writing the test data packet of the transmitting node for testing in the U-turn node by the receiving bus master; and routing the test data packet of the U-turn node to the test node by the transmitting bus master.

In the preferred embodiment of the present invention, the network board of the base station having a plurality of transmitting and receiving nodes can identify, before the communication system is established, whether the respective transmitting and receiving routing buses and functions of the respective transmitting and receiving nodes are normal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
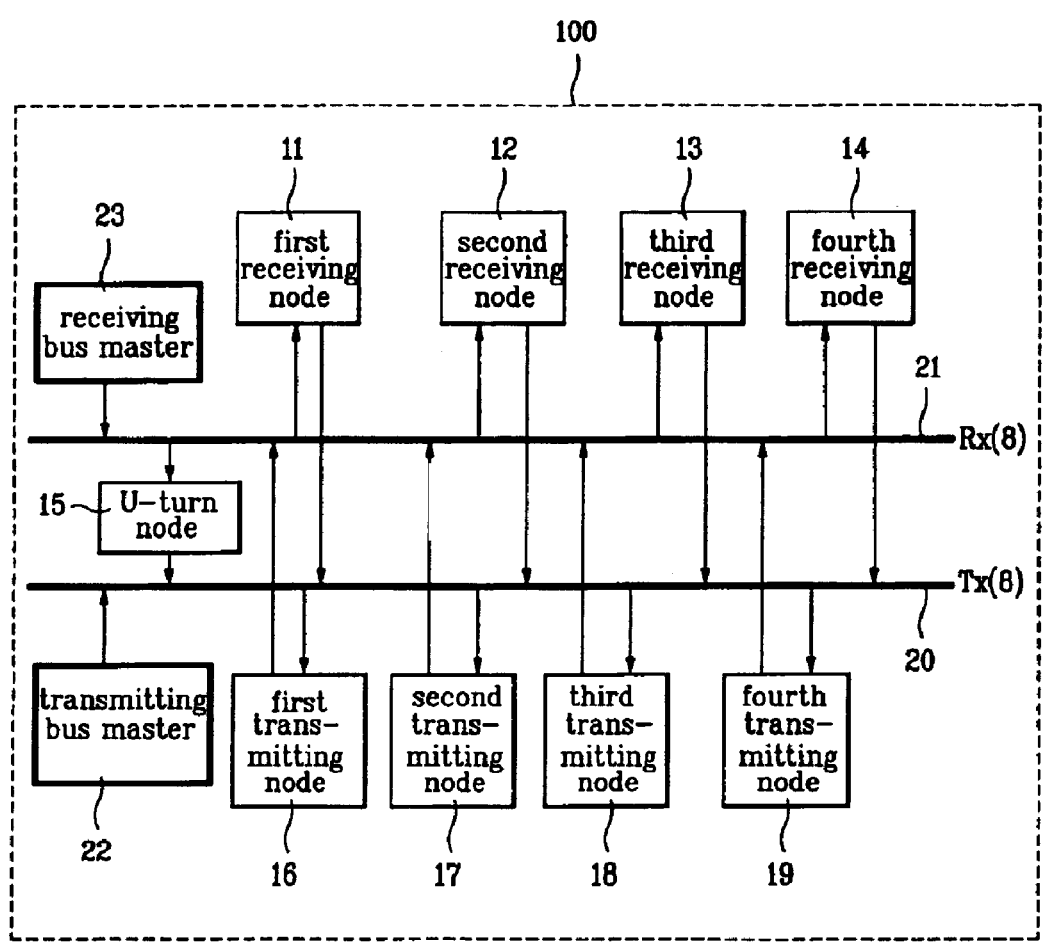
FIG. 1 shows transmitting and receiving nodes in a network board that enables communication between processors in the related art base station system.
Figure 2:
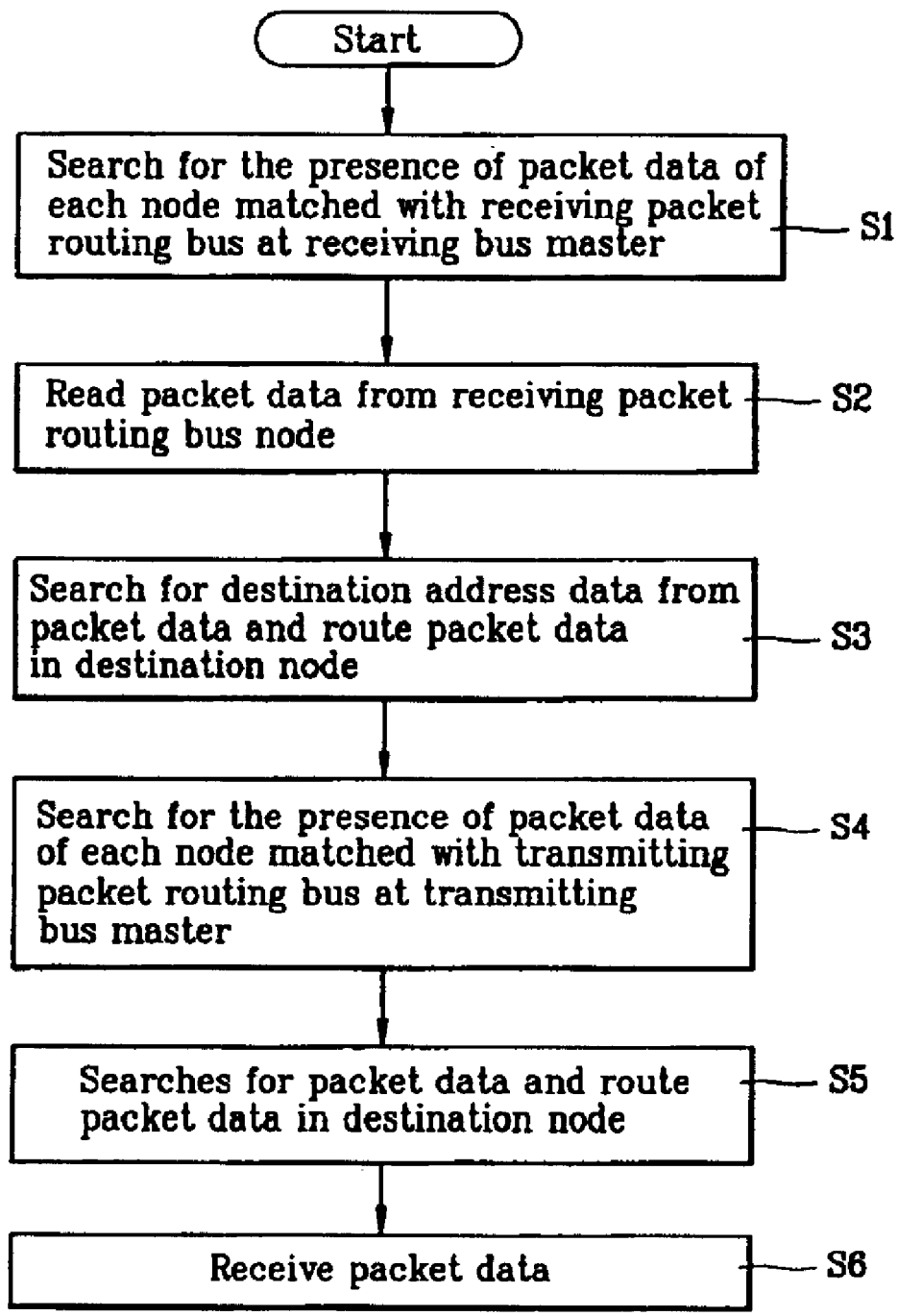
FIG. 2 is a flow chart showing a packet routing method of the transmitting and receiving nodes of FIG. 1.
Figure 3:
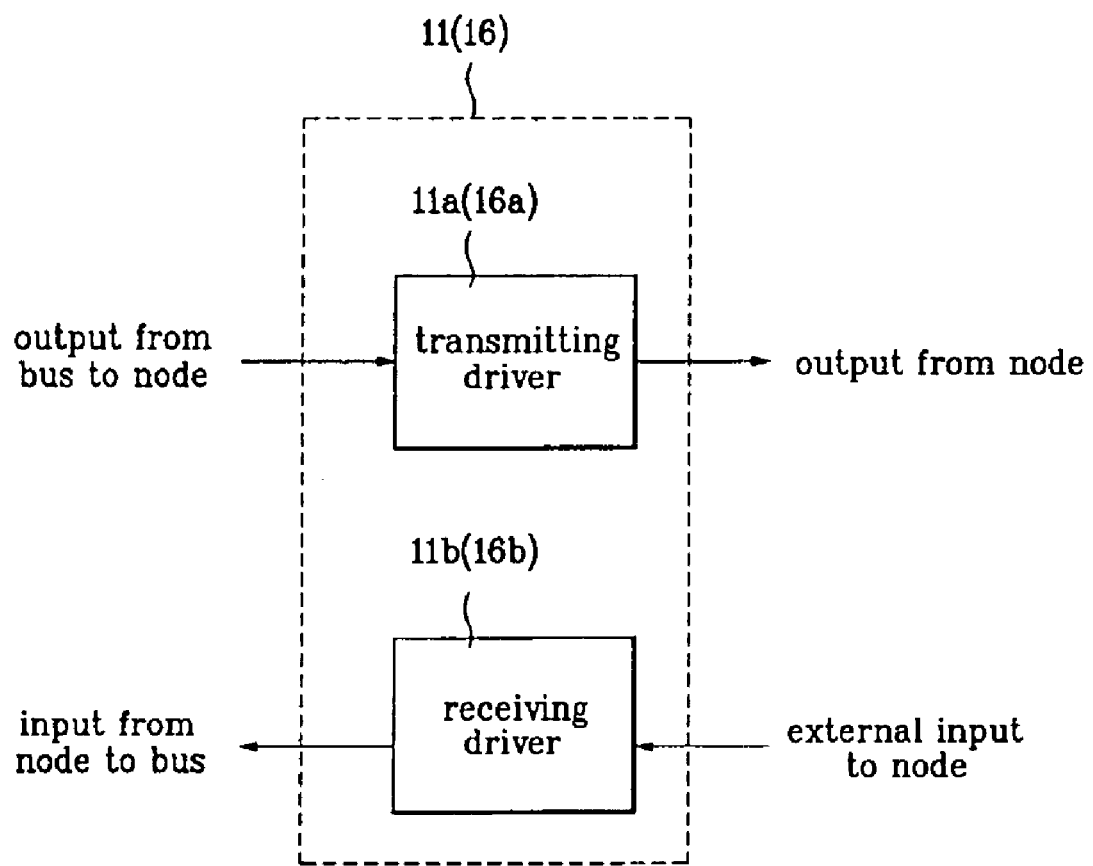
FIG. 3 is a detailed view showing the transmitting and receiving nodes of FIG. 1.
Figure 4:
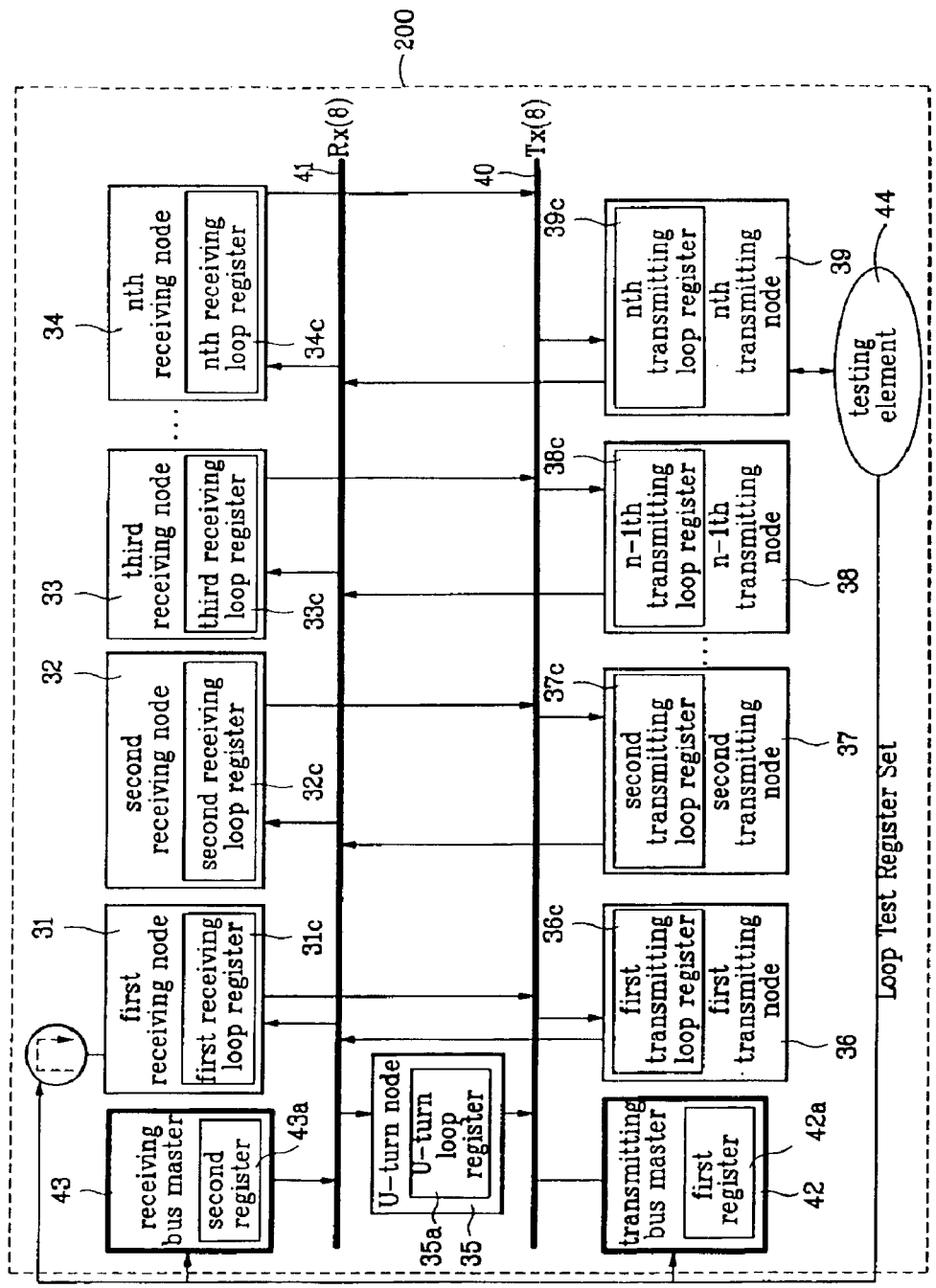
FIG. 4 shows a receiving loop test path of a receiving node in a network board that enables communication between processors in a base station system according to the present invention.
Figure 5:
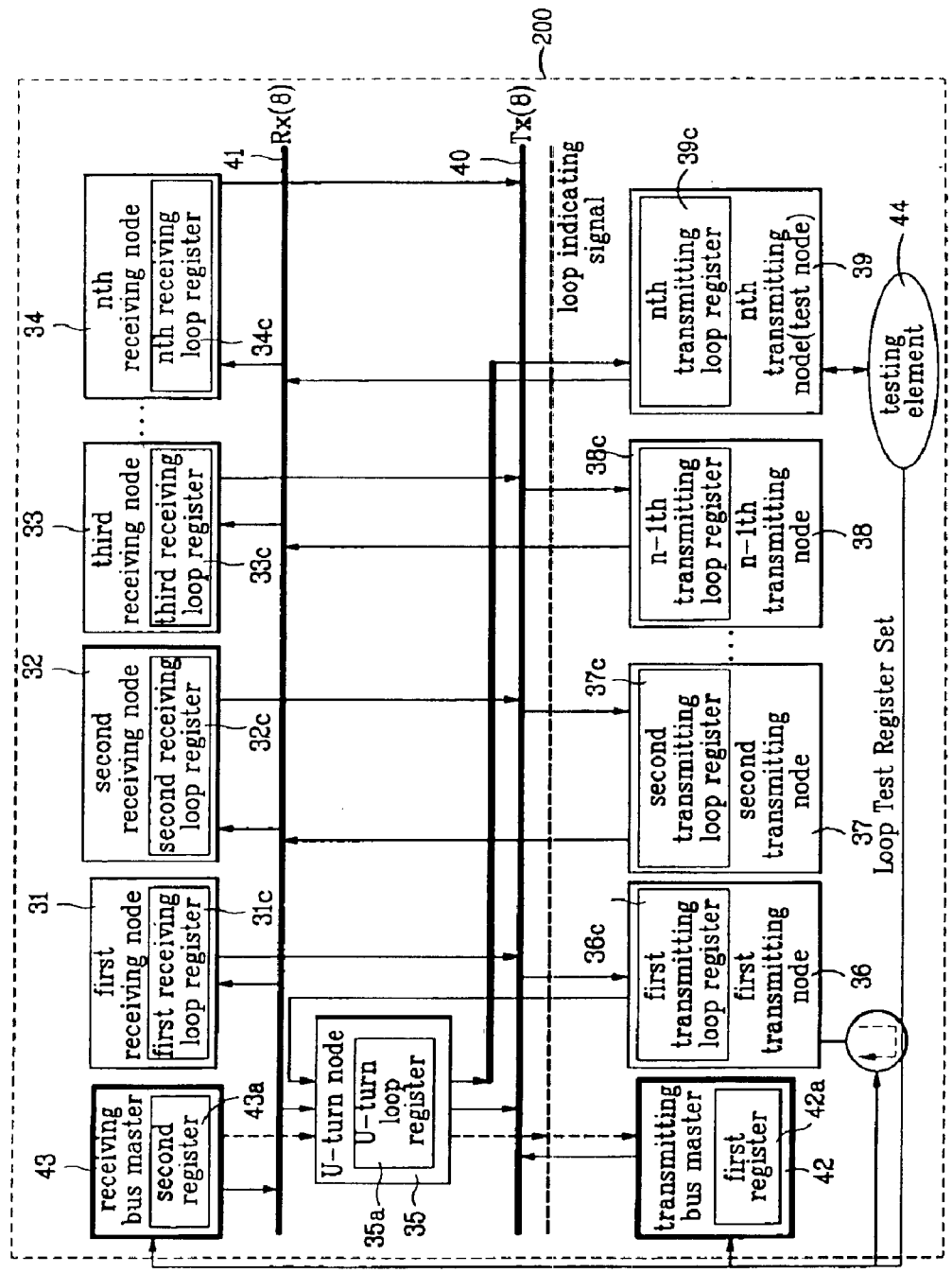
FIG. 5 shows a transmitting loop test path of the transmitting nodes of FIG. 4.

FIG. 4 shows a receiving loop test path of a receiving node in a network board that enables communication between processors in the base station system according to the present invention, and FIG. 5 shows a transmitting loop test path of the transmitting nodes of FIG. 4.

Referring to FIG. 4, the receiving and transmitting loop test paths of the transmitting and receiving nodes in a network board 200 that enables communication between processors of the base station system according to the present invention include first to nth receiving nodes 31, 32, 33, . . . 34 (Rx nodes), first to nth transmitting nodes 36, 37, 38, . . . 39 (Tx nodes), transmitting and receiving packet routing buses 40 and 41 of a fill-duplex transmission mode, a transmitting bus master 42, a receiving bus master 43, and a U-turn node 35. The receiving nodes 31–34 are connected to the trunk board of a base station controller. The transmitting nodes 36–39 are connected to a processor board (for example, an alarm collection & maintenance board assembly) and a system clock board (for example, a timing management circuit board assembly) in the network board 200. The transmitting bus master 42 searches the receiving nodes 31–34 and generates a control signal if there is a data packet in the receiving nodes 31–34. In such a case, the data packet is read onto the transmitting packet routing bus 40 and written to a destination transmitting node of the transmitting nodes 36–39. The receiving bus master 43 searches transmitting nodes 36–39 and generates a control signal if there is a data packet in the transmitting nodes 36–39. In such a case, the data packet is read onto the receiving packet routing bus 41 and written to a destination receiving node of the receiving nodes 31–34. The U-turn node 35 U-turns the data packet generated by the transmitting nodes 36–39 if the destination address of the data packet is one of the transmitting nodes 36–39.

Any one of the transmitting nodes 36–39 may be used as a test node for conducting a test is transmitted from a testing element 44. In the present embodiment, the nth transmitting node 39 is set as a test node.

The test node may be used as a node for routing test data packet. The test node may also be used as a transmitting node after finishing its test function.

FIG. 4 shows first and second registers 42a and 43a. These registers are used for storing the addresses of the transmitting and receiving nodes, which in turn are used for testing the transmitting and receiving bus masters 42 and 43.

FIG. 4 also shows first to nth receiving loop registers 31c, 32c, 33c, . . . , 34c in the receiving nodes 31–34 and first to nth transmitting loop registers 36c, 37c, 38c, . . . , 39c in the transmitting nodes 36–39. In this example, after writing the test program in the nth transmitting node 39 using the testing element 44, a central processing unit (CPU) of the network board 200 stores a loop value, for example '1', in the receiving loop registers 31c–34c and the transmitting loop registers 36c–39c, if the data packet is stored in the transmitting node or the receiving node for test.

Alternately, the receiving loop registers 31c–34c and the transmitting loop registers 36c–39c may exist between the receiving nodes 31–34 and the testing element 44 and between the transmitting nodes 36–39 and the testing element 44, instead of inside the respective transmitting and receiving nodes.

A U-turn loop register 35a in the U-turn node 35 stores a loop value '0' if the data packet is written in the first to n-1 st transmitting nodes 36, 37, . . . , 38 of the transmitting nodes 36–39, and stores a loop value '1' if the data packet is written in the nth transmitting node 39 from the testing element 44. If the loop value '1', is stored in the U-turn loop register 35a, it is noted that the test data packet for a loop test on the transmitting node has been received. That is to say, if the loop value '1' is stored in the U-turn loop register 35a of the U-turn node 35, the transmitting bus master 42 writes the data packet of the U-turn node 35 to the transmitting node stored in the first register 42a. If the loop value '0' is stored in the U-turn loop register 35a of the U-turn node 35, the transmitting bus master 42 searches for a destination address in a data format of the data packet written to the U-turn node 35 and writes the data packet to the transmitting node with the appropriate destination address. In a similar fashion, FIG. 5 shows a transmitting loop test path of the transmitting nodes of FIG. 4.

Figure 6:
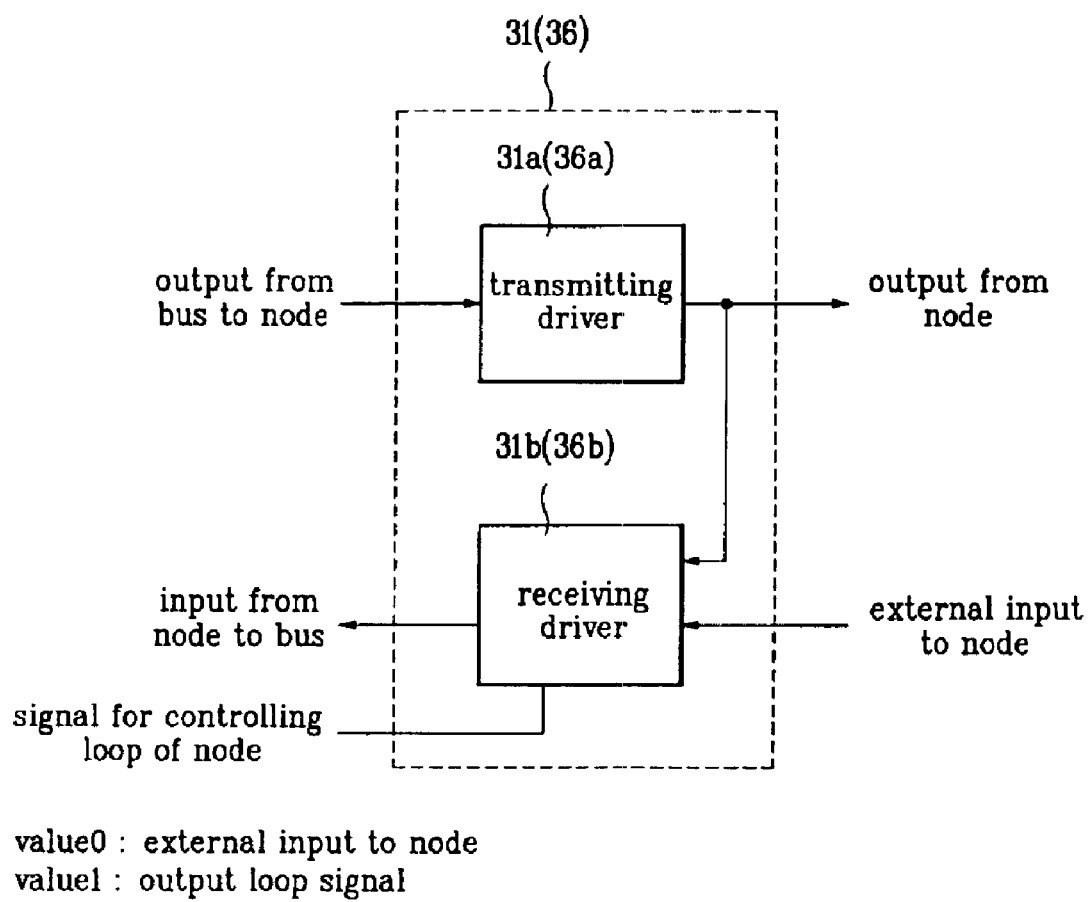
FIG. 6 is a detailed view showing the transmitting and receiving nodes of FIG. 4.

FIG. 6 is a detailed view showing the transmitting and receiving nodes of FIG. 4 and FIG. 5. In FIG. 6, the first receiving node 31 is representative of the receiving nodes 31–34 and the first transmitting node 36 is representative of the transmitting nodes 36–39.

The first receiving node 31 includes a transmitting driver 31*a* and a receiving driver 31*b*. The transmitting driver 31*a* routes the data packet written in the receiving packet routing bus 41 to the trunk node of the base station controller. The receiving driver 31*b* reads the data packet routed from the trunk node of the base station controller to the transmitting packet routing bus an 40. If a first receiving loop register 31*c* for controlling the loop value of the first receiving node 31 has a value '0', the receiving driver 31*b* receives the external input value into the first transmitting node 31. If the first receiving loop register 31*c* has a value '1', the output value of the transmitting driver 31 a is looped to the receiving driver 31*b*.

The first transmitting node 36 includes a transmitting driver 36*a* and a receiving driver 36*b*. The transmitting driver 36*a* routes the data packet written in the transmitting packet routing bus 40 to the other processsor of the base station system. The receiving driver 36*b* reads the data packet routed from the other processor of the base station system to the receiving packet routing bus 41. If a first transmitting loop register 36*c* for controlling the loop value of the first transmitting node 39 has a value '0', then the receiving driver 36*b* receives the external input from the first transmitting node 36. If the first receiving loop register 36*c* has a value '1', then the output value of the transmitting driver 36*a* is looped to the receiving driver 36*b*.

Figure 7:
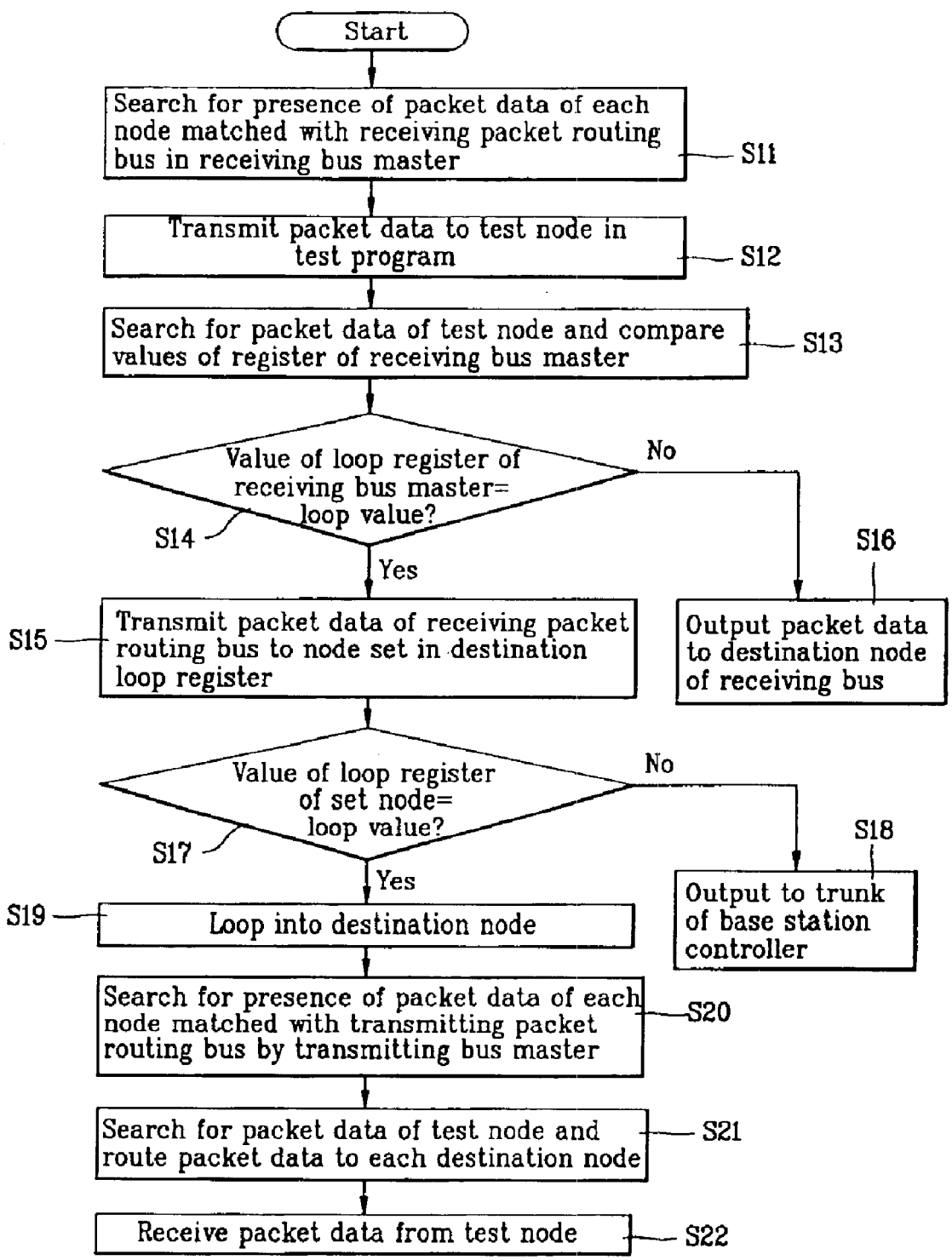
FIG. 7 is a flow chart showing a loop test method of the receiving nodes of FIG. 4.

FIG. 7 is a flow chart showing a loop test method of the receiving nodes of FIG. 4. As shown in FIGS. 7 and 4, the receiving bus master 43 periodically searches for the presence of a data packet in the transmitting nodes 36–39 matched with the receiving packet routing bus 41 (step S11).

At this time, if the CPU that controls the network board 200 performs a loop test for one of the receiving nodes 31–34 by generating a test data packet in the testing element 44, then the test data packet is written to the nth transmitting node 39 (the test node) (step S12). Then, an address value of the receiving node for testing the receiving nodes 31–34 is written to the first and second registers 42*a* and 43*a* of the transmitting bus master 42 and the receiving bus master 43. Respective address values of the receiving nodes 31–34 and the transmitting nodes 36–39 are set in advance as n-bit binary values. The set address values are stored in the first and second registers 42*a* and 43*a*. At this time, the destination address of the test data packet is set in advance as the nth transmitting node 39.

For example, if the address value stored in the first and second registers 42*a* and 43*a* is '000001', the first receiving node 31 is intended to loop the test data packet. If the address value is '00001', the second receiving node 32 is intended to loop the test data packet. If the address value is '000011', the third receiving node 33 is intended to loop the test data packet. Likewise, in the respective transmitting nodes 36, 37, . . . , 38, 39, address values of the transmitting nodes 36–39 are written in the first and second registers 42*a* and 43*a*. At this time, the address value '000000' may be written in the first and second registers 42*a* and 43*a*. In such a case, the data packet is routed to the trunk of the base station controller or the processor board of the base station system. If the data packet is not the test data packet, the data packet is routed according to the destination address.

A loop indicating signal is transmitted to a loop register (one of the loop registers 31*c*–34*c*) of the receiving node for a loop test, so that a loop value '1' is written to that loop register.

Subsequently, the receiving bus master 43 compares the address values of the second register 43*a* of the receiving bus master 43 with one another (step S13) and determines whether the address values are set as loop values (step S14). At this time, if values (other than the value '000000'0 among n-bit address values) are written in the second register 43*a*, then the loop test is set.

As a result of step S14, if the value written in the second register 43*a* of the receiving bus master 43 is set as a loop test value (for example, '000001'), the receiving bus master 43 reads the data packet of the nth transmitting node 39 into the receiving packet routing bus 41 using the control signal and that data packet is transmitted to the receiving node (if '000001', then the first receiving node 31) corresponding to the address value of the second register 43*a* (step S15).

However, as a result of step S14, if the value written in the second register 43*a* of the receiving bus master 43 is not set as a loop test value (for example, '000000'), the receiving bus master 43 writes the data packet of the nth transmitting node 39 to the destination receiving node (receiving nodes 31–34) according to the destination address from the data packet of the receiving packet routing bus 41, and outputs the data packet from the receiving node, which receives the data packet, to the truck of the base station controller (step S16). In this case, the data packet is not a test data packet but actual data packet to be transmitted to the trunk board of the base station controller.

Subsequently, if the test data packet is written to the first receiving node 31, it is determined whether the value of the first receiving loop register 31*c* of the first receiving node 31 is set as a loop value. That is to say, as shown in FIG. 6, it is determined whether the value of the first receiving loop register 31*c* of the first receiving node 31 is set as a loop value '0' or '1', (step S17).

As a result of the step S17, if the value of the first receiving loop register 31*c* is not set as a loop value (i.e., if the value is '0'), the value is output to the trunk of the base station controller without a loop test (step S18).

However, if the value of the first receiving loop register 31*c* of the first receiving node 31 is set as '1', the value is looped from the transmitting driver 31*a* of the first receiving node 31 to the receiving driver 31*b* (step S19). At this time, if the loop values of the second receiving loop register 32*c* to the nth receiving loop register 34*c* (except for the first receiving loop register 31*c* of the first receiving node 31) are initially set as '0', it is possible to identify whether or not the test data packet generated by the nth transmitting node 39 is subject to a loop test in the receiving node.

Subsequently, the transmitting bus master 42 periodically searches for the presence of data packet in the first receiving node 31 matched with the transmitting packet routing bus 40 (step S20).

If there is a data packet in the first receiving node 31, the transmitting bus master 42 reads the data packet in the transmitting packet routing bus 40 using the control signal. Then, the transmitting bus master 42 searches for the destination address in the read data packet and routes the data packet in the nth transmitting node 39 set as the destination node (step S21).

Finally, if the test data packet generated by the nth transmitting node 39 is received in the nth transmitting node 39 (which is the test node), then the CPU for controlling the network board 200 detects the test data packet in order to analyze both the function of the first receiving node 31, which is subject to a loop test, and the test results of the receiving path. Likewise, a function test (or identification) for the second to nth receiving nodes 32, 33, . . . , 34 and a test for a receiving path thereof can be performed.

Figure 8:
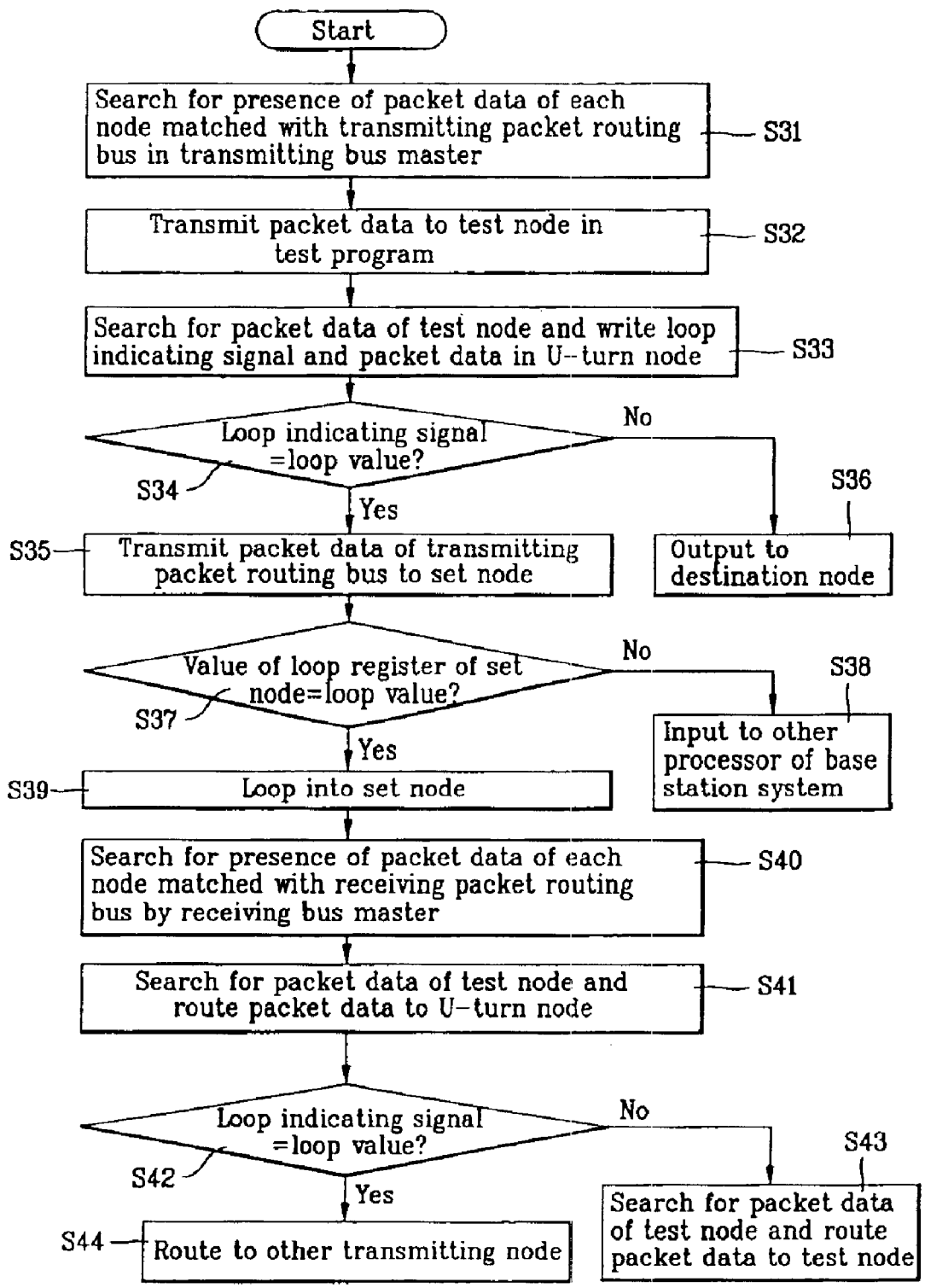
FIG. 8 is a flow chart showing a loop test method of the transmitting nodes of FIG. 5.

FIG. 8 is a flow chart showing a loop test method for the transmitting nodes in the network board shown in FIG. 5.

As shown in FIGS. 8 and 5, the transmitting bus master 42 periodically searches for the presence of transmitting data packet in the receiving nodes 31–34 matched with the transmitting packet routing bus 40 (step S31).

At this time, if the CPU for controlling the network board 200 desires to perform a loop test for one of the transmitting nodes 36–39 by generating the test data packet in the testing element 44, the test data packet is written to the nth transmitting node 39 (test node) (step 32). Then, an address value of the transmitting node for testing the transmitting nodes 36–39 is written to the first and second registers 42a and 43a of the transmitting bus master 42 and the receiving bus master 43.

At this time, as described above, the respective address values of the transmitting nodes 36–39 are set in advance as n-bit binary values. One of the set address values is written to the first and second registers 42a and 43a. A loop indicating signal is transmitted to a loop register (one of the loop registers 36c–39c) of the transmitting node for a loop test, such that a loop value of '1' is written to that loop register. In this case, the first transmitting node 36 is set as a transmitting node for a loop test and the destination address of the test data packet is set in advance as the nth transmitting node 39.

Subsequently, the receiving bus master 43 searches for the transmitting nodes 36–39 matched with the receiving packet routing bus 41. Then, if there is a data packet, the receiving bus master 43 compares the address values of the transmitting nodes 36–39 of the second register 43a with one another and determines whether the data packet is set as a loop value in accordance with the address values of the second register 43a.

If the address value of the test node, written in the second register 43a of the receiving bus master 43, matches the address values of the transmitting nodes 36–39, then the receiving bus master 43 sets a value of '1' to the loop indicating signal in the U-turn loop register 35a of the U-turn node 35 and writes the test data packet generated by the nth transmitting node 39.

In other words, the receiving bus master 43 writes the value '1' of the loop indicating signal in the U-turn node 35 only if the test data packet is generated by the nth transmitting node 39 (the test node). If the data packet is generated in the other transmitting nodes (i.e., other than the test node), a value of '0' is set to the loop indicating signal and is written to the U-turn node 35 (step S33).

Subsequently, the transmitting bus master 42 periodically searches for the presence of a data packet in the transmitting nodes 36–39 and the U-turn node 35 matched with the transmitting packet routing bus 40 and determines whether or not the value in the U-turn loop register 35a of the U-turn node 35 is set as the loop value '1', (step S34).

As a result of step S34, if the loop indicating signal of the U-turn loop register 35a has a value '0', then the data packet is generated by the first to n-1st transmitting nodes 36–38 (not the nth transmitting node 39). Accordingly, the transmitting bus master 42 searches for the destination address in a data format of the data packet and writes the destination address to the transmitting node thereof. That is to say, the destination address is output to a destination node (one of the transmitting nodes 36–38) and transmitted to the processor board within the base station through the destination node (step S36). In this case, the base station processor board connected to any transmitting node (other than the one containing the test data packet) transmits the data packet to the other base station processor board.

However, if the value of the U-turn loop register 35a is set as '1', the test data packet of the U-turn node 35 is read onto the transmitting packet routing bus 40 and written to the first transmitting node 36 (which is the test node) according to the loop register address written in the first register 42a (step S35).

Then, it is determined whether or not the loop value written to the first transmitting loop register 36c of the first transmitting node 36 is set as '1' (step S37). As a result of the step S37, if the value written in the first transmitting loop register 36c is not set as a loop value (i.e., if the value is '0'), the data packet is transmitted from the first transmitting node 36 to the other processor board of the base station (step S39).

However, as a result of the step S37, if the value written to the first transmitting loop register 36c is set as a loop value (i.e., if the value is '1'), the data packet is looped from the transmitting driver 36a of the first transmitting node 36 into the receiving driver 36b (step S38).

Subsequently, the receiving bus master 43 periodically searches the first to nth transmitting nodes 36–39 matched with the receiving packet routing bus 41 (step S40). If there is a test data packet in the first transmitting node 36, the receiving bus master 43 generates a control signal so that the test data packet of the first transmitting node 36 is read onto the receiving packet routing bus 41. Then, the test data packet is written to the U-turn node 35 according to the addresses of the second register 43a of the receiving bus master 43 (step S41). At this time, the receiving bus master 43 writes the loop value '0' in the U-turn loop register 35a of the (U-turn node 35 because the test data packet is generated by the first transmitting node 36 and not the test node (i.e., the nth transmitting node 39).

The transmitting bus master 42 then searches the U-turn node 35 and determines whether the loop indicating signal is set as '1' (step S42).

As a result of the step S42, if the loop indicating signal is '0', the transmitting bus master 42 searches for the destination address in the data format of the test data packet and routes the test data packet in the destination node (i.e., the nth transmitting node 39) through the transmitting packet routing bus 40 according to the search result (step S43). However, as a result of the step S43, if the loop indicating signal is '1', the transmitting bus master 42 routes the data packet in the transmitting node of the first register 42a of the transmitting bus master 42.

The loop test apparatus of a packet routing bus in a communication system and the loop test method thereof according to the present invention have the following advantage. In a network board which supports communication between the processors of a base station system having a plurality of transmitting and receiving nodes, the functionality of both the transmitting nodes which provides communication between the processor in the receiving node connected to the trunk of the base station controller and the processor in the base station and a function of the packet routing bus can be tested, thereby improving reliability of the communication system.

It will be apparent to those skilled in the art that various modifications and variations can be made in the loop test apparatus of a packet routing bus in a communication system and the loop test method thereof according to the present invention without departing from the spirit or scope of the invention. Thus, it is intended that the present invention covers the modifications and variations of the invention provided they come within the scope of the appended claims and their equivalents.

What is claimed is:

1. A loop test apparatus of a packet routing bus comprising:
    a transmitting node and a receiving node, each including a transmitting driver and a receiving driver and each having a loop path for a data packet from the corresponding transmitting driver to the receiving driver;
    a transmitting bus master including a register for storing an address of one of the transmitting node and receiving node for managing a transfer of the data packet on a transmitting packet routing bus;
    a receiving bus master including a register for storing an address of one of the transmitting node and receiving node for managing a transfer of the data packet on a receiving packet routing bus; and
    a testing element for writing a test data packet to one of the transmitting node and the receiving node and writing the address of one of the transmitting node and the receiving node to transmit or receive the test data packet to or from the register of the corresponding bus master.

2. The loop test apparatus as claimed in claim 1, wherein the transmitting node includes a transmitting loop register for storing a signal corresponding to whether the data packet is routed as one of a data packet and a loop data packet.

3. The loop test apparatus as claimed in claim 1, wherein the receiving node includes a receiving loop register for storing a signal corresponding to whether the data packet is routed as one of a data packet and a loop data packet.

4. The loop test apparatus as claimed in claim 2, wherein the transmitting loop register is between the testing element and the receiving node.

5. The loop test apparatus as claimed in claim 1, wherein the test data packet of the testing element is written to the transmitting node.

6. The loop test apparatus as claimed in claim 1, wherein the transmitting node reads the data packet from the receiving packet routing bus and the receiving node reads the data packet from the transmitting packet routing bus.

7. The loop test apparatus as claimed in claim 1, wherein the transmitting node is connected to a processor board of a base station system and the receiving node is connected to a trunk node of a base station controller.

8. The loop test apparatus as claimed in claim 1, further comprising a U-turn node connecting the transmitting packet routing bus to the receiving packet routing bus.

9. The loop test apparatus as claimed in claim 8, wherein the U-turn node includes a loop register for storing a loop indicating signal used to loop a data packet from the receiving packet routing bus to the transmitting packet routing bus.

10. In a network board having a plurality of transmitting and receiving nodes each having a transmitting driver and a receiving driver, and transmitting and receiving packet routing buses for transmitting and receiving data to and from the transmitting and receiving nodes, and transmitting and receiving bus masters for controlling the transmitting and receiving packet routing buses, a loop test method of a packet routing bus comprising the steps of:
    writing a test data packet for routing in a receiving node to a test node for testing by a testing element;
    writing the test data packet of the test node to the transmitting driver of the receiving node by the receiving bus master;
    looping the test data packet from the transmitting driver of the receiving node to the receiving driver of the receiving node; and
    routing the test data packet to the receiving driver of the test node by the transmitting bus master,
    wherein when writing the test data packet to the test node, the testing element writes an address value of the receiving node used for receiving the test data packet to the transmitting and receiving bus masters and generates a loop indicating signal if the test data packet is received in the receiving node.

11. The loop test method as claimed in claim 10, wherein the step of writing the test data packet to the test node includes the steps of:
    searching for a presence of the test data packet in the test node by the receiving bus master;
    reading the test data packet from the receiving packet routing bus using a control signal if the test data packet is detected in the test node; and
    writing the test data packet to the receiving node by the receiving bus master according to an address stored in the testing element.

12. In a network board having a plurality of transmitting and receiving nodes each having a transmitting driver and a receiving driver, transmitting and receiving packet routing buses for transmitting and receiving a data packet to and from the transmitting and receiving nodes, a U-turn node for U-turning the data packet of the receiving packet routing bus to the transmitting packet routing bus, a transmitting bus master for controlling the transmitting packet routing bus, and a receiving bus master for controlling the receiving packet routing bus, a loop test method of a packet routing bus comprising the steps of:
    writing a test data packet for routing in a transmitting node to a test node for testing by a testing element;
    writing the test data packet to the U-turn node by the receiving bus master;
    writing the test data packet of the U-turn node to the transmitting node for testing by the transmitting bus master;
    writing the test data packet of the transmitting node to the U-turn node for testing by the receiving bus master; and
    routing the test data Packet of the U-turn node to the test node by the transmitting bus master,
    wherein the testing element stores an address value of the transmitting node for receiving the test data packet when writing the test data packet in the transmitting nodes and generates a loop indicating signal for looping the test data packet if the test data packet is received in the transmitting node used for receiving the test data packet.

13. In a network board having a plurality of transmitting, and receiving nodes each having a transmitting driver and a receiving driver, transmitting and receiving Racket routing buses for transmitting and receiving a data packet to and from the transmitting and receiving nodes, a U-turn node for U-turning the data packet of the receiving packet routing bus to the transmitting packet routing bus, a transmitting bus master for controlling the transmitting packet routing bus, and a receiving bus master for controlling the receiving packet routing bus, a loop test method of a packet routing bus comprising the steps of:

writing a test data packet for muting in a transmitting node to a test node for testing by a testing element;

writing the test data packet to the U-turn node by the receiving bus master;

writing the test data packet of the U-turn node to the transmitting node for testing by the transmitting bus master;

writing the test data packet of the transmitting node to the U-turn node for testing by the receiving bus master; and routing the test data packet of the U-turn node to the test node by the transmitting bus master, wherein the receiving bus master writes to the U-turn node both the test data packet and a loop indicating signal used to indicate whether the test data packet is read from one of the test node and the transmitting node for test.

14. In a network board having a plurality of transmitting and receiving nodes each having a transmitting driver and a receiving driver, transmitting and receiving packet routing buses for transmitting and receiving a data packet to and from the transmitting and receiving nodes, a U-turn node for U-turning the data packet of the receiving packet routing bus to the transmitting packet routing bus, a transmitting bus master for controlling the transmitting packet routing bus, and a receiving bus master for controlling the receiving packet routing bus, a loop test method of a packet routing bus comprising the steps of:

writing a test data packet for routing in a transmitting node to a test node for testing by a testing element;

writing the test data packet of the test node to the U-turn node by the receiving bus master;

writing the test data packet of the U-turn node to the transmitting node for testing by the transmitting bus master;

writing the test data packet of the transmitting node to the U-turn node for testing by the receiving bus master; and routing the test data packet of the U-turn node to the test node by the transmitting bus master, wherein the step of writing the test data packet of the test node to the U-turn node by the receiving bus master includes the steps of:

searching for a presence of the test data packet in both the test node of the transmitting nodes and the transmitting node for test by the receiving bus master;

reading the test data packet in the receiving packet routing bus using a control signal if the test data packet is detected in one of the test node and the transmitting node for test; and writing to the U-turn node both the test data packet and a the loop indicating signal used to indicate whether the test data packet is read from one of the test node and the transmitting node for test according to a destination address of the test data packet by the receiving bus master.

15. In a network board having a plurality of transmitting and receiving nodes each having a transmitting driver and a receiving driver, transmitting and receiving packet routing buses for transmitting and receiving a data packet to and from the transmitting and receiving nodes, a U-turn node for U-turning the data packet of the receiving packet routing bus to the transmitting packet routing bus, a transmitting bus master for controlling the transmitting packet routing bus, and a receiving bus master for controlling the receiving packet routing bus, a loop test method of a packet routing bus comprising the steps of:

writing a test data packet for routing in a transmitting node to a test node for testing by a testing element;

writing the test data packet to the U-turn node by the receiving bus master, writing the test data packet of the U-turn node to the transmitting node for testing by the transmitting bus master;

writing the test data packet of the transmitting node to the U-turn node for testing by the receiving bus master; and routing the test data packet of the U-turn node to the test node by the transmitting bus master, wherein the step of routing the test data packet of the U-turn node includes the step of referring to a destination address in a data format field of the test data packet if a loop indicating signal is not set as a loop value.

\* \* \* \* \*